July 18, 1961     O. J. OLSON ET AL     2,992,746
ELECTRO-MECHANICAL MANIPULATOR
Filed July 31, 1957                            4 Sheets-Sheet 1
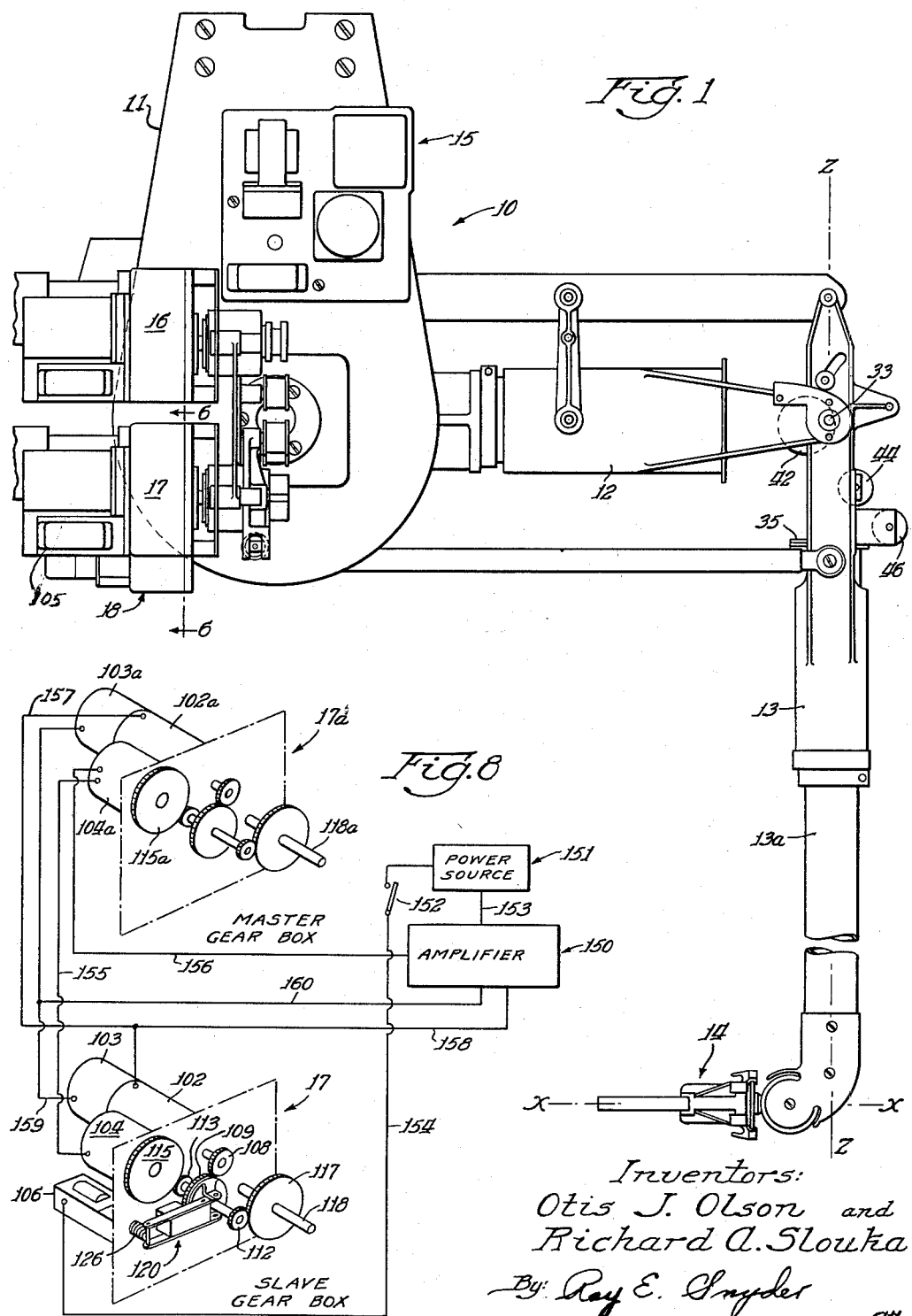
Inventors:
Otis J. Olson and
Richard A. Slouka
By: Ray E. Snyder
Atty.

July 18, 1961
O. J. OLSON ET AL
2,992,746
ELECTRO-MECHANICAL MANIPULATOR
Filed July 31, 1957
4 Sheets-Sheet 2
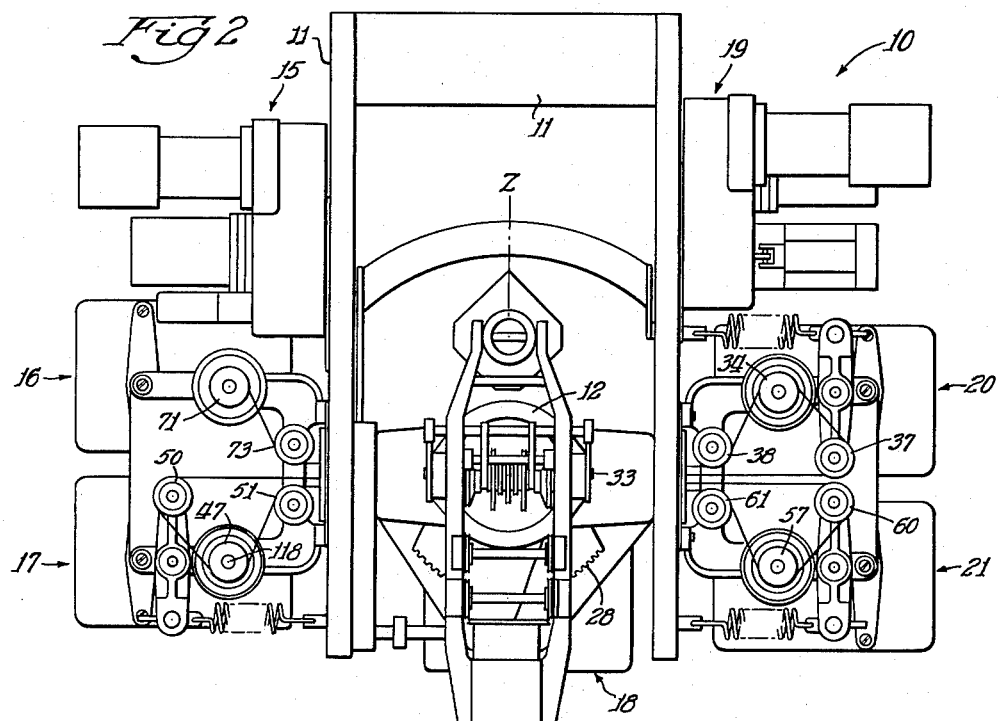
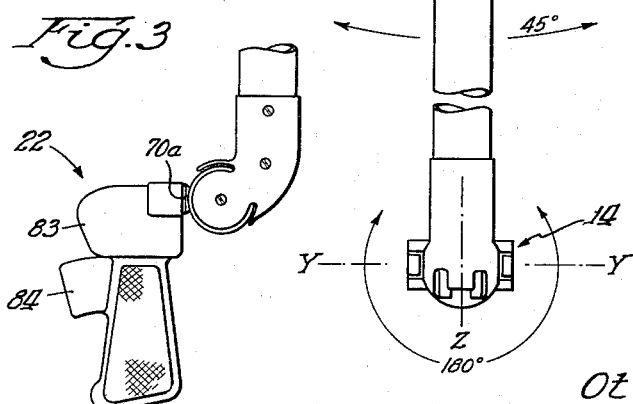
Inventors:
Otis J. Olson and
Richard A. Slouka
By: Ray E. Snyder
Atty.

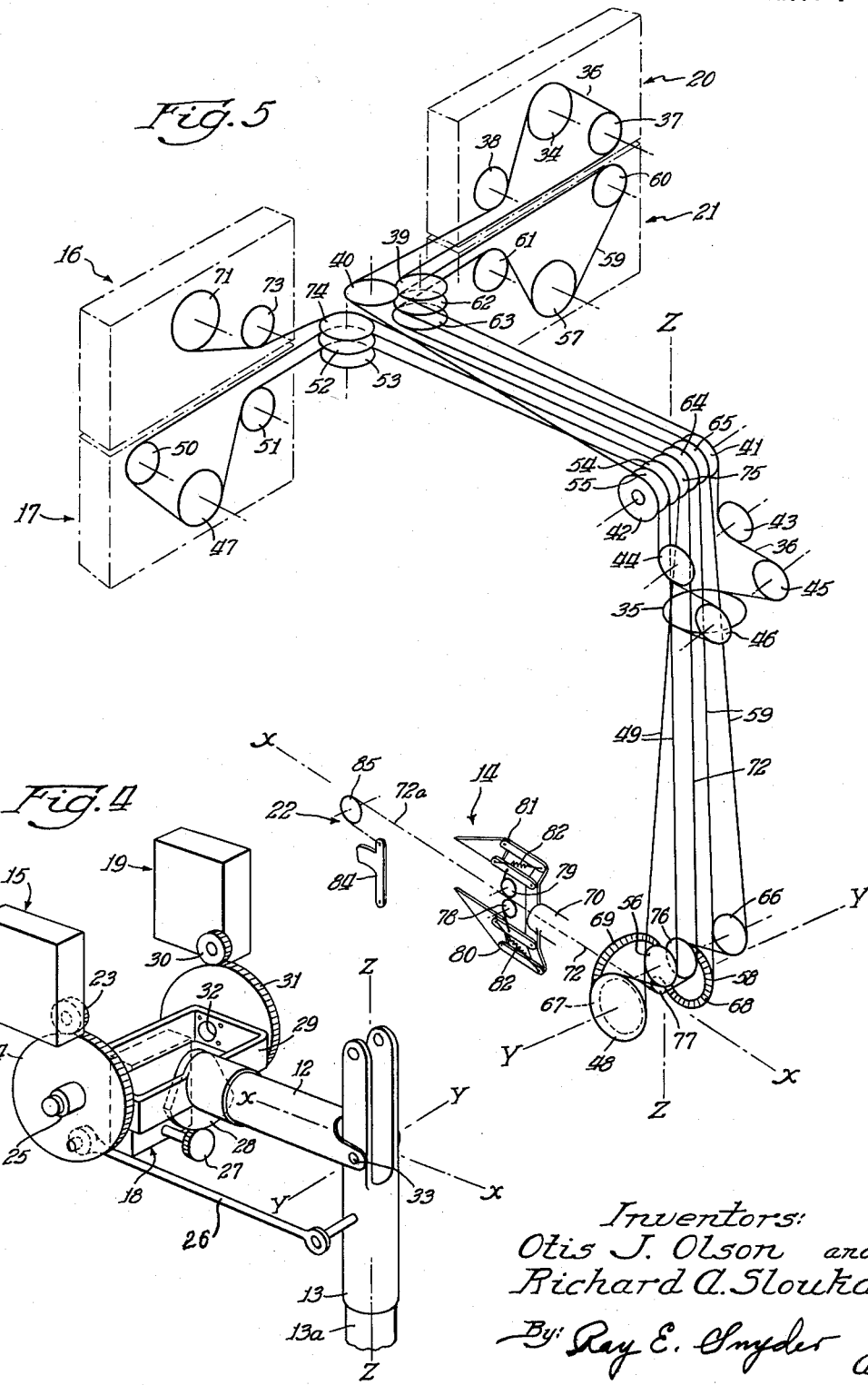

July 18, 1961

O. J. OLSON ET AL 2,992,746

ELECTRO-MECHANICAL MANIPULATOR

Filed July 31, 1957

Inventors:
Otis J. Olson and
Richard A. Slouka
By: Ray E. Snyder
Atty.

United States Patent Office 2,992,746
Patented July 18, 1961

2,992,746
ELECTRO-MECHANICAL MANIPULATOR
Otis J. Olson, Decatur, and Richard A. Slouka, Carpentersville, Ill., assignors to Borg-Warner Corporation, Chicago, Ill., a corporation of Illinois
Filed July 31, 1957, Ser. No. 675,295
2 Claims. (Cl. 214—1)

This invention relates to remote control electromechanical master-slave manipulators. More particularly, the present invention relates to a motion lock and safety device for a slave manipulator, operable in the event of electrical power failure or when desired for particular operations.

A remote control electromechanical master-slave manipulator of the type involved is disclosed in U.S. Patent No. 2,846,084, and assigned to the United States of America as represented by the United States Atomic Energy Commission.

Manipulators of this type in general comprise a master assembly and a slave assembly which are electrically interconnected and are substantially identical in construction. The master assembly is operated by a hand control mechanism, motions of which are transmitted to a plurality of separate gear boxes by a plurality of cables and gears. The motions transmitted to the individual gear boxes are transmuted therein into electrical impulses which are transmitted to the individual respective gear boxes of the slave assembly. The electrical impulses are there transmuted back into mechanical motions which are transmitted by a plurality of cables and gears to a grasping tool carried by the slave assembly. The master-slave manipulator is so designed that the motion of the grasping tool accurately reproduces the motion of the hand control tool as it is moved by the operator. In addition, the master-slave manipulator is designed to reflect forces exerted by the slave assembly back to the master assembly so as to give the operator a sense of feeling of the operation of the slave assembly.

Remote control master-slave manipulators of this general type were developed for the purpose of handling highly radioactive materials or very hot materials that would otherwise endanger the health and safety of personnel working with such materials. The electromechanical master-slave manipulator was developed in order to increase the distance between the operator and the material being handled. The material handled is occasionally in the form of liquids contained in glass beakers or test tubes.

One of the disadvantages of the electromechanical master-slave manipulator disclosed in said patent, lies in the fact that in the event of electrical power failure, control of the slave manipulator is completely lost with the possibility of spilling or breaking the containers of the radioactive material.

Furthermore, in the performance of particular operations, it is desirable to lock the position of the slave manipulator with respect to certain of its motions while remaining free to operate with respect to the remainder of the motions of which it is capable. For example, it may be desirable to lock the tongs of the grasping tool holding an object so as to reduce operator fatigue while performing other operations. Also, it may be desirable to lock the slave manipulator with respect to its translational motions while leaving it free to perform certain rotational motions. For example, an operator could turn a ratchet screw driver or wrench or a dial without having to concentrate on holding the grasping tool in a particular position to perform such rotational motions. Also, in the event that two slave manipulator arms are being utilized, one arm could be used to grasp an object and hold it fixed in a particular position while performing operations upon it with the other arm. The existing remote control master-slave manipulators are incapable of operating in this manner.

Accordingly, it is an object of the present invention to provide an improved electromechanical master-slave manipulator incorporating a motion lock and safety device which is operable in the event of electrical power failure to prevent damage to the material being handled.

More particularly, it is an object to provide a safety device in each of the separate gear boxes of the slave manipulator effective in the event of electrical power failure to freeze the position of the slave manipulator in its position existing at the moment of such power failure.

It is still another object to provide electrical solenoid operated safety devices effective to instantaneously freeze seven different motions of a slave manipulator in the event of electrical power failure.

It is also an object to provide an improved electromechanical slave manipulator incorporating motion locks in its separate gear boxes which are selectively operable to lock the slave manipulator with respect to one or more of the motions of which it is capable.

It is also an object to provide an electrically operated motion lock and electrical switch means for operating such motion lock in each of several electrical circuits interconnecting the respective gear boxes of an electromechanical master-slave manipulator.

The invention consists of the novel constructions, arrangements, and devices to be hereinafter described and claimed for carrying out the above stated objects and such other objects as will appear from the following description of a preferred embodiment of the invention, illustrated with reference to the accompanying drawings, wherein:

FIG. 1 is an elevational side view of a slave assembly of the remote control manipulator of the present invention carrying a plurality of gear boxes and a grasping tool;

FIG. 2 is an elevational end view of the slave assembly;

FIG. 3 is an elevational side view of the hand control tool for a master assembly illustrated in position corresponding to the position of the grasping tool shown in FIG. 1;

FIG. 4 is a schematic illustration of the gearing by which translational motions are transmitted from the respective gear boxes of the slave assembly;

FIG. 5 is a schematic illustration of the cables and pulleys, by which rotational motions are transmitted from the respective gear boxes of the slave assembly;

FIG. 8 is a diagrammatic view showing one of the plurality of duplicate electric systems interconnecting the respective master and slave units of the manipulator.

Like characters of reference designate like parts in the several views.

Figure 6:
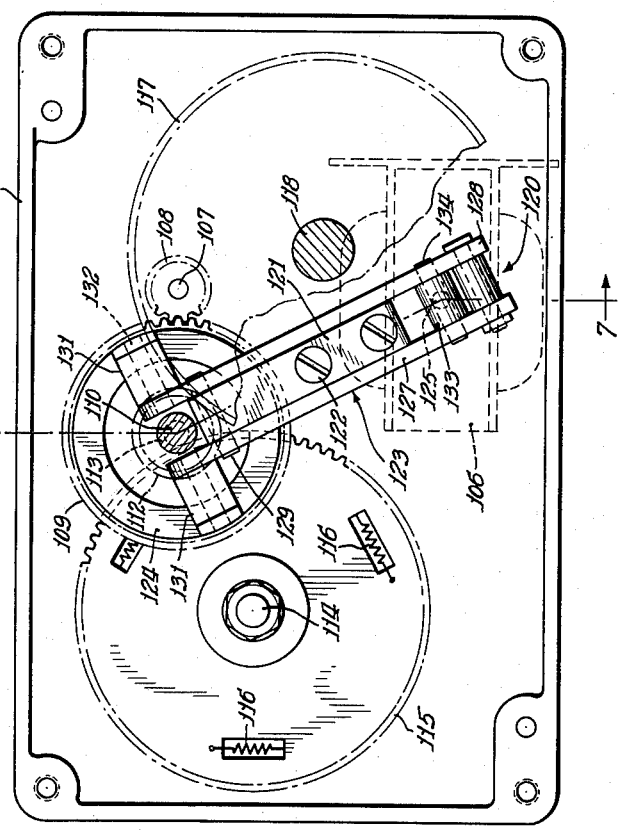
FIG. 6 is a view taken along line 6—6 of FIG. 1 and showing the interior of one of the gear boxes of the slave assembly.

Referring now to FIGS. 1, 2, and 3 there is illustrated a slave manipulator assembly 10 which comprises a frame 11, a horizontal arm 12 pivotally mounted on the frame 11, a vertical arm 13 pivotally mounted upon the horizontal arm 12, a grasping tool 14 mounted on the lower end of the vertical arm 13, and gear box assemblies 15, 16, 17, 18, 19, 20, and 21 all except 18 being mounted upon the frame 11, and the gear box 18 being mounted upon the horizontal arm 12. A master control unit (not shown) for the slave assembly 10 is substantially identical in construction to the slave assembly 10 except for differences to be hereinafter described, and except for a hand control tool 22 mounted on the lower end of a vertical arm 13 in place of the grasping tool 14.

The grasping tool 14 is oriented in space with respect to three mutually perpendicular axes corresponding to the position of the hand control tool 22. The three mutually perpendicular axes are designated by X—X, Y—Y, and Z—Z respectively on the figures.

The grasping tool 14 is capable of seven distinct types of motion under the influence of the hand control tool 22. These seven motions comprise three translational motions:

(1) Along the horizontal X axis,
(2) Along the horizontal Y axis, and
(3) Along the vertical Z axis; three rotational motions:
(4) About the X axis,
(5) About the Y axis, and
(6) About the Z axis; the 7th motion is the grasping action of the tool 14.

The seven motions described above are transmitted from the hand control tool 22 to the respective gear boxes of the master assembly and from the respective gear boxes 15—21 of the slave assembly to the grasping tool 14 by a plurality of gears and cables, as will now be described.

Translational motions of the grasping tool 14 are generated by the gear boxes 15, 18, and 19. A gear 23 is rotatably mounted on and driven by the gear box 15 and is in mesh with and drives a relatively large gear 24. The gear 24 is journalled on a hub 25 forming a part of the mounting frame 11. A connecting shaft 26 is attached at one end to the gear 25 at a point near the periphery thereof and at its other end to the vertical arm 13. A gear 27 is rotatably mounted on and driven by the gear box 18 and is in mesh with a sector gear 28 which is attached to the horizontal arm 12. The horizontal arm 12 is journalled within a generally rectangular shaped member 29 disposed between depending members of the frame 11. A gear 30 is rotatably mounted on and driven by the gear box 19 and is in mesh with and drives a relatively large gear 31 which is journalled on a hub 32 forming a part of the frame 11. The member 29 is attached at one side to the gear 31 and is journalled at its other side on the hub 25.

Translational motion of the grasping tool 14 along the X axis is produced primarily by rotation of the gear 23. The gear 23 drives the gear 24, and tangential motion of the gear 24 is transmitted through the connecting shaft 26 to the vertical arm 13. The vertical arm swings pivotally about a pin 33 which connects the vertical arm 13 to the horizontal arm 12. The vertical arm 13 and the grasping tool 14 are thus caused to move pendulously in the XZ plane.

Translational motion along the Y axis is produced primarily by the gear box 18. The gear 27 drives the sector gear 28 which causes the horizontal arm 12 to turn about its own axis. The vertical arm 13 attached to the horizontal arm 12 and the grasping tool 14 are thus caused to swing pendulously in the YZ plane.

Translational motion of the grasping tool 14 along the Z axis is produced primarily by the gear box 19. The gear 30 is driven by the gear box 19 and drives the gear 31. The rectangular shaped member 29 attached to the gear 31 is caused to move arcuately with the gear 31 and carries the horizontal arm 12 and vertical arm 13 with it. The arms 12 and 13 and the grasping tool 14 are thus caused to move pendulously in the XZ plane.

It is apparent that the three translational motions above described of the grasping tool 14 are produced by rotational motions of the three gears 23, 27, and 30, and pure translational motion in any given direction must be produced by two or more of the gear boxes acting together. To illustrate, suppose that it is desired to move the grasping tool 14 purely along the X axis. Rotation of the gear 23 causes the grasping tool 14 to move in an arc in the XZ plane about the pin 33. To maintain the grasping tool 14 in motion along the X axis, the horizontal arm 12 must be depressed below a horizontal position, which means that the gear 30 must drive the gear 31 and member 29 to produce this depression. Similarly, to produce pure translational motion along the Y axis the gear 27 must rotate the sector gear 28 and horizontal arm 12 so as to cause the grasping tool 14 to swing in an arc about the axis of the horizontal arm 12. To maintain the grasping tool in motion along the Y axis the horizontal arm 12 must be depressed below the horizontal by means of the gear box 19 and the gear 30 as described above for motion along the X axis.

Rotational motions of the grasping tool 14 are generated by the gear boxes 17, 20, and 21. In particular, rotation about the Z axis is produced by the gear box 20. A drum 34 is rotatably disposed on and driven by the gear box 20. The drum 34 is connected to a drum 35 by means of a cable 36. The drum 35 is fixedly disposed in a horizontal plane on top of a vertical shaft 13a rotatably disposed within the vertical arm 13. The cable 36 extends from the drum 34 to the drum 35 over a plurality of pulleys 37, 38, 39, 40, 41, 42, 43, 44, 45, and 46. The pulley 37 functions to maintain tension in the cable 36 and the pulleys 38—46 are idler pulleys which function to change the direction of the cable between the drums 34 and 35. The cable 36 appears as a continuous cable in the drawing (FIG. 5), but is actually two separate cables with one end of each anchored to both drums 34 and 35 so as to ensure positive rotation of the drum 35 when driven by the drum 34 for either direction of rotation.

Rotation of the grasping tool 14 about the X axis or about the Y axis is accomplished by simultaneous coaction of the gear boxes 17 and 21. The gear box 17 has a drum 47 rotatably mounted thereon and driven thereby which is connected to a drum 48 adjacent to the grasping tool 14 by means of a cable 49. The cable 49 extends over a plurality of pulleys 50, 51, 52, 53, 54, 55, and 56. The pulley 50 functions to maintain tension in the cable 49, and the pulleys 51—56 are idler pulleys which function to change the direction of the cable 49 between the drums 47 and 48.

The gear box 21 has a drum 57 rotatably mounted thereon and driven thereby which is connected to a drum 58 adjacent to the grasping tool 14 by means of a cable 59. The cable 59 extends around a plurality of pulleys 60, 61, 62, 63, 64, 65, and 66. The pulley 60 functions to maintain tension in the cable 59 and the pulleys 61—66 are idler pulleys which function to change the direction of the cable 59 between the drums 57 and 58.

The cables 49 and 59 each comprise two separate cables, the ends of which are anchored to each of the drums 47 and 48, and 57 and 58, respectively, so as to ensure positive rotation of the drum 48 and 58 for either direction of rotation of the drums 47 and 57 respectively.

The drums 48 and 58 are axially displaced with respect to each other and are connected to the grasping tool 14 by means of a gearing arrangement which comprises, a beveled gear 67 and a beveled gear 68 attached to the axially facing sides of the drums 48 and 58, respectively. A third beveled gear 69 is disposed at right angles to and in mesh with both of the gears 67 and 68. The gear 69 is formed integrally with a shaft 70 which is attached to the grasping tool 14.

The grasping action of the tool 14 is produced by the gear box 16. The gear box 16 has a drum 71 rotatably disposed thereon and connected to the grasping tool 14 by means of a cable 72. The cable 72 extends around pulleys 73, 74, 75, 76, 77, and 78, and 79. The cable 72 is a single strand and is anchored at one end to the drum 71 and is spliced at its other end with each of the spliced ends extending around the pulleys 78 and 79 and being anchored to the tongs 80 and 81 of the grasping tool 14. The pulleys 73—79 are all idler pulleys which function to change the direction of the cable 72 between the drum 71 and the grasping tool 14. A continuous or double strand cable between the drum 71 and the grasping tool 14 is unnecessary for this motion because the cable 72 is maintained under tension by means of springs 82 mounted on the grasping tool 14. The springs 82 also tend to maintain the tongs 80 and 81 of the grasping tool 14 in a normally open condition.

In operation, the manner in which the rotation of the grasping tool 14 about the X, Y, and Z axes is produced will now be described.

To produce rotation about the Z axis, the gear box 20 drives the drum 34 in one direction or the other and tangential motion of the drum 34 is transmitted through the cable 36 around the several pulleys 37—46 to the drum 35. The drum 35 and the vertical shaft 13a upon which the grasping tool 14 is mounted are caused to rotate either clockwise or counter clockwise about the vertical Z axis in accordance with the direction of rotation of the drum 34.

To produce rotation of the grasping tool 14 about the horizontal Y axis, the gear boxes 17 and 21 drive the drums 47 and 57, respectively. The tangential motion of the drums 47 and 57 is transmitted by means of the cables 49 and 59, respectively, to the drums 48 and 58. The drums 48 and 58 rotates simultaneously in the same direction and cause the gear 69, shaft 70, and grasping tool 14 to move arcuately in the XZ plane. The beveled gear 69 in mesh with the gears 67 and 68 does not rotate about its own axis for this particular motion.

To produce rotation of the grasping tool 14 about the X axis, each of the gear boxes 17 and 21 drives the cables 49 and 59, respectively, and the drums 48 and 58, except that the drums 48 and 58 in this case are driven in opposite directions of rotation with respect to each other. The relatively opposite direction of rotation of the gears 67 and 68 causes the gear 69 to rotate either clockwise or counter clockwise about its own axis, carrying the grasping tool 14 with it.

It is apparent that rotational motion of the grasping tool 14 about any axis other than the three given axes requires the co-action of two or all three of the gear boxes 17, 20, and 21.

The grasping action of the tool 14 is accomplished by the gear box 16 which drives the drum 71 and the cable 72 so as to increase the tension in the cable 72 sufficiently to overcome the action of the springs 82 and close the tongs 80 and 81 of the grasping tool. When the torque driving the drum 71 is removed, the springs 82 function to open the tongs 80 and 81 of the grasping tool 14.

The hand control tool 22 shown in FIG. 3 corresponds to and is interchangeable with the grasping tool 14 and comprises a casing 83 of a generally pistol-grip configuration and a trigger bar 84 pivotally mounted within the casing 83. The casing 83 is affixed to a rotatable shaft 70a corresponding to the shaft 70 of the grasping tool 14. The trigger bar 84 has one end of a cable 72a attached to it which corresponds to the cable 72. The cable 72a extends around a pulley 85 rotatably mounted within the casing 83 and is attached at its other end to a drum mounted upon a gear box of a master assembly corresponding to the drum 71 and gear box 16.

The hand control tool 22 is operated in a conventional manner by squeezing the trigger bar 84 to close the tongs 80 and 81 of the grasping tool 14. This tool 22 is more completely described in pending application S.N. 676,032 of Richard A. Slonka filed August 2, 1957.

Figure 7:
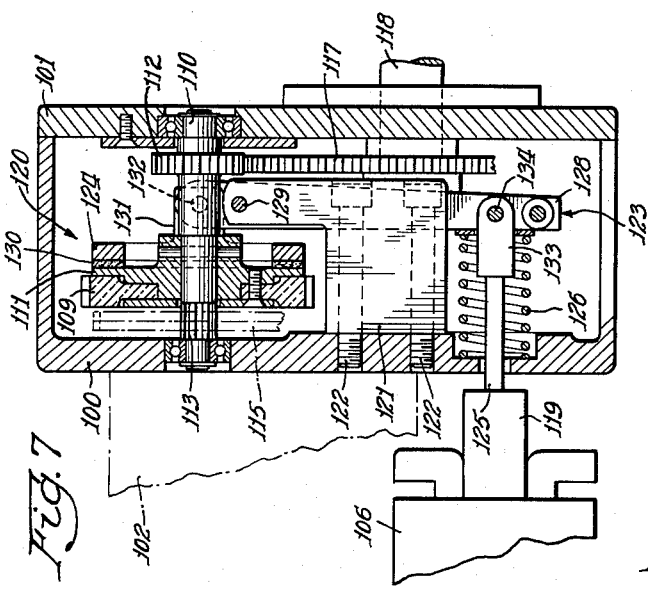
FIG. 7 is a view partly in section taken along line 7—7 of FIG. 6.

Referring now to FIGS. 6 and 7, the interior of the gear box 17 is shown as typical of the gear boxes 15—21, all of which are substantially identical. The gear box 17 in general comprises a box like housing 100 and a cover plate 101. On the exterior of the housing 100 are mounted a control motor 102 carrying a tachometer 103, a synchro transmitter or a control transformer 104, a multiple connector socket 105 and a solenoid 106. The control motor 102 has a rotatable shaft 107 extending into the interior of the housing 100 and carries a pinion 108. The pinion 108 is in mesh with a fiber gear 109 fixedly mounted on a shaft 110 by means of a face plate 111. The shaft 110 is journaled at one end in the housing 100 and at its other end in the cover plate 101. The shaft 110 carries a pinion 112 near the end journalled in the cover plate 101 and has a gear 113 formed thereon near its other end. The synchro transmitter or control transformer 104 has a rotatable shaft 114 extending into the interior of the housing 100 and has a gear 115 fixedly mounted thereon. The gear 115 is in mesh with the gear 113 and comprises two adjacent gears of equal diameter interconnected by means of springs 116. The springs 116 ensure that the two parts of the gear 115 are closely in mesh with the gear 113 for either direction or rotation. The pinion 112 is in mesh with a relatively large gear 117 fixedly mounted upon an output shaft 118. The output shaft 118 extends through and is journalled within the cover plate 118 and is also journalled at one end in the housing 100. All of the gears within the housing 100 are interconnected so that when one rotates all must rotate.

The solenoid 106 carries an armature 119 and is adapted to operate a brake mechanism indicated generally by the numeral 120. The brake mechanism 120 in general comprises, a pivot block 121 mounted within the housing 100 by machine screws 122. A lever arm 123, an annular brake plate 124, a pull rod 125, and a spring 126. The lever arm 123 comprises two parallel bars 127 and 128 spaced on opposite sides of the pivot block 121 and pivoted thereon by means of a pin 129. The annular brake plate 124 is disposed concentrically with respect to the shaft 110 and carries a friction facing 130 adapted to engage the face plate 111. The brake plate 124 is also formed with lugs 131 which are attached to one end of the lever bars 127 and 128 by means of pins 132.

The pull rod 125 extends through the housing 100 and is attached at one end to the armature 119 of the solenoid 106 and at its other end to the lever arm 123 by means of a connecting link 133. The link 133 is attached to the lever arm 123 by means of a pin 134 and is threaded on its interior to one end of the pull rod 125. The spring 126 surrounds the pull rod 125 and is disposed under constant compression between the housing 100 and the bars 127.

When the solenoid 106 is energized, which occurs when the other electrical controls are energized, the armature 119 is pulled in toward the center of the solenoid 106 carrying the pull rod 125 with it and compressing the spring 126. The force of the solenoid 106 upon the armature 119 is transmitted to the pull rod 125 and the link 133 to the lever arm 123 and is effective to lift the brake plate 124 out of engagement with the face plate 111. All of the gears within the housing 100 are then free to move under the influence of the control motor 102 or synchro transmitter 104.

Referring now to FIG. 8, there is illustrated a schematic diagram of one of seven duplicate electrical systems interconnecting the respective gear boxes of the master slave assembly and the slave assembly. Each of the electrical systems in general comprises the slave assembly gear box 17, a corresponding master assembly gear box 17a, an amplifier 150, a power source 151, and a normally closed manual switch 152. The amplifier 150 is connected to the power source 151 by means of a conduit 153. The solenoid 106 of the gear box 17 is energized from the power source 151 through the normally closed manual switch 152 and through a conduit 154. The synchro transmitter 104 on the slave assembly gear box 17 is interconnected with a synchro control transformer 104a on the master assembly gear box 17a by means of a conduit 155. The synchro control transformer 104a is also connected to the amplifier 150 by means of a conduit 156. The control motor 102 on the gear box 17 is interconnected with a control motor 102a on the gear box 17a by means of a conduit 157, and the conduit 157 is connected to the amplifier 150 by means of a branch conduit 158. The tachometer 103 on the control motor 102 is interconnected with a tachometer 103a on the control motor 102a by means of a conduit 159, and the conduit 159 is connected to the amplifier 150 by means of a branch conduit 160.

The control motors 102 and 102a may be of any suitable type such as model No. FPE 25–81–4 made by the Diehl Manufacturing Co. of Somerville, New Jersey, and described in Form 3290–B dated, January 3, 1955. The synchro control transmitter 104 and the control transformer 104a may be of standard types such as 23CX4 and 23CT6 made by the Bendix Aviation Corp. or the Arga Co. The amplifier 150 may be of any suitable type, such as described in said patent, and will not be further described; and the power source 151 can be an ordinary 110 volt A.C. source.

In operation, mechanical motions are transmitted from the hand control tool 22 through a cable and gearing arrangement as described above to the respective gear boxes of the master control assembly. In particular, motion can be imparted by the hand control 22 through a cable to a drum mounted on an input shaft 118a of the master gear box 17a. Rotation of the shaft 118a is transmitted through the the gearing arrangement to the synchro control transformer 104a. A voltage signal is generated by the control transformer 104a corresponding to the angular rotation of the gear 115a and this signal is transmitted to the amplifier 150 through the conduit 156 and to the synchro transmitter 104 through the conduit 155. This signal is amplified in the amplifier 150 and is transmitted to the control motor 102 through the conduits 158 and 157. The control motor 102 drives the gear 108 and through the gearing of the gear box 17 to the output shaft 118. The output shaft 118 drives the drum 47 fixed to it which motion is transmitted through the cable 49 to the drum 48. The signal transmitted from the amplifier 150 to the control motor 102 is also transmitted through the conduit 157 to the control motor 102a. The control motor 102a is caused to exert a torque on the gearing arrangement within the gear box 17a, which torque is transmitted back to the hand control tool 22 so as to give the operator a sense of feeling of the force exerted by the grasping tool 14.

The solenoid 106 is energized through the conduit 154 and the normally closed switch 152 from the power source 151 which is also the power source for the amplifier 150. The energized solenoid 106 is effective on the brake mechanism 120 so as to disengage the said mechanism and allow free rotation of the gears within the gear box 17. In the event that an electrical power failure should occur, the solenoid 106 is de-energized and the spring 126 is effective to engage the brake mechanism 120 and lock all of the gears within the gear box 17. Alternatively, when it is desired to lock only one of the seven motions controlled by the respective gear boxes 15—21, it is only necessary to open the switch corresponding to the switch 152 which de-energizes the solenoid 106 and the brake mechanism 120 is engaged by the spring 126 as previously described in the case of electrical power failure.

It is to be noted that only the solenoid 106 is de-energized by opening the switch 152, and the amplifier 150 remains in operation. An electrical voltage signal is generated by the synchro transmitter 104 corresponding to the locked position of the gear 115 within the gear box 17.

This signal is transmitted through the conduit 155, the control transformer 104a, the conduit 156, the amplifier 150, the conduit 158, and the conduit 157, to the control motor 102a. Any tendency by the operator exerted upon the hand control tool 22 to move the control tool 22 from this particular lock position is resisted by torque developed by the hand motor 102a. It is possible for the operator to overpower the locking effect of the master control assembly, however, the slave assembly remains in its locked condition.

The operation of the gear boxes 17 and 17a and the electrical interconnection therebetween has been described in general terms as typical of the operation of all of the gear boxes 15—21. It is apparent that the other gear boxes 15, 16, 18—21 function in a substantially identical manner to control their respective motions.

There has been provided by this invention a device effective in the event of electrical power failure to lock the position of an electromechanical master slave manipulator in all of its aspects. There has also been provided by this invention electrical switch means selectively operable to lock the slave manipulator in one or more of its aspects.

It is to be understood that our invention is not to be limited to the specific construction and arrangement shown and described, except only insofar as the claims may be so limited, as it will be understood to those skilled in the art that changes may be made without departing from the principles of the invention.

We claim:

1. In a remote-control manipulator, the combination of a master assembly and a slave assembly; a control tool for operating said master assembly; a remotely operated grasping tool carried by said slave assembly; electrical means interconnecting said master and slave assemblies for controlling said grasping tool by said control tool; a source of electrical power for energizing the manipulator; a plurality of electrically operated gear boxes for producing particular motions of said grasping tool by said control tool; an electrically operated brake mechanism mounted within each of said gear boxes; and an electrical switch connected with each of said gear boxes for operating said brake mechanism and locking the particular motion of said grasping tool controlled by a gear box.

2. In a remote-control manipulator, the combination of a master assembly and a slave assembly; a control tool for operating said master assembly; a remotely operated grasping tool carried by said slave assembly; electrical means interconnecting said master and slave assemblies for controlling said grasping tool by said control tool; a source of electrical power for energizing the manipulator; a plurality of electrically operated gear boxes for producing particular motions and the grasping action of said grasping tool by said control tool; an electrically operated brake mechanism associated with each of said gear boxes; and an electrical switch associated with each of said gear boxes for operating said brake mechanism and locking the grasping action of said grasping tool.

References Cited in the file of this patent

UNITED STATES PATENTS

| | | |
|---|---|---|
| 2,679,940 | Goertz et al. | June 1, 1954 |
| 2,822,094 | Greer | Feb. 4, 1958 |